(12) United States Patent
Hong et al.

(10) Patent No.: US 7,667,703 B2
(45) Date of Patent: Feb. 23, 2010

(54) SYSTEMS AND METHOD FOR TURNING PAGES IN A THREE-DIMENSIONAL ELECTRONIC DOCUMENT

(75) Inventors: Lichan Hong, Mountain View, CA (US); Stuart K. Card, Los Altos Hills, CA (US); Jock D. Mackinlay, Palo Alto, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 660 days.

(21) Appl. No.: 10/739,175

(22) Filed: Dec. 19, 2003

(65) Prior Publication Data

US 2005/0151742 A1   Jul. 14, 2005

(51) Int. Cl.
  *G06T 15/70* (2006.01)
(52) U.S. Cl. .................. 345/473; 345/420; 345/428
(58) Field of Classification Search .............. None
  See application file for complete search history.

(56) References Cited

U.S. PATENT DOCUMENTS

| | | | |
|---|---|---|---|
| 5,463,725 A * | 10/1995 | Henckel et al. | 715/776 |
| 5,838,326 A | 11/1998 | Card et al. | |
| 5,847,709 A | 12/1998 | Card et al. | |
| 6,340,980 B1 | 1/2002 | Ho | |
| 6,407,757 B1 * | 6/2002 | Ho | 715/776 |
| 6,486,895 B1 * | 11/2002 | Robertson et al. | 715/776 |
| 6,525,732 B1 * | 2/2003 | Gadh et al. | 345/428 |
| 7,081,882 B2 * | 7/2006 | Sowden et al. | 345/156 |
| 7,102,639 B2 * | 9/2006 | Oka | 345/428 |
| 7,315,312 B2 * | 1/2008 | Hemmings | 345/649 |
| 7,386,804 B2 * | 6/2008 | Ho et al. | 715/776 |
| 2002/0035697 A1 | 3/2002 | McCurdy et al. | |
| 2002/0054121 A1 | 5/2002 | Seng | |

(Continued)

FOREIGN PATENT DOCUMENTS

WO   WO 03/040908 A1   5/2003

OTHER PUBLICATIONS

Chu et al. ("How to Turn the Page"), May 2003, Digital Libraries, pp. 186-188.*

(Continued)

*Primary Examiner*—Ulka Chauhan
*Assistant Examiner*—Andrew Yang
(74) *Attorney, Agent, or Firm*—Oliff & Berridge, PLC

(57) ABSTRACT

A system and method for turning pages of a three-dimensional electronic book. A closed three-dimensional electronic book is modeled as at least one three-dimensional object having length, width and thickness dimensions. An opened three-dimensional book electronic is modeled as at least two three-dimensional objects having length, width and thickness dimensions, representing the left side of the opened book and the right side of the opened book. The page(s) to be turned is modeled as at least a three-dimensional object having length, width and thickness dimensions. The cross-section parallelogram having a width dimension and a thickness dimension based on the width and thickness dimensions of the closed three-dimensional electronic book, and a user-selected number of page(s) to be turned. Page turning of a three-dimensional electronic book is modeled as a dynamic animation showing the concurrent movement of three three-dimensional objects representing the left side pages block, the right side pages block, and the pages(s) to be turned.

24 Claims, 15 Drawing Sheets

U.S. PATENT DOCUMENTS

2002/0113823 A1* 8/2002 Card et al. .................. 345/776
2003/0052900 A1   3/2003 Card et al.
2003/0117425 A1* 6/2003 O'Leary et al. ............. 345/700

OTHER PUBLICATIONS

Chu Y. et al., *Realistic Books: A Bizarre Homage to an Obsolete Medium?*; Joint ACM/IEEE Conference on Digital Libraries; pp. 78-86; 2004.

FlipBrowser; http://web.archive.org/web/20001018000231/www.flipbrowser.com/home.php, Dec. 22, 2003.

Zinio.com—Same Magazines. New Experience. http://web.archive.org/web/20020527231503/http://www.zinio.com/, Dec. 22, 2003, 2 pages.

Turning the Pages on the web; http://www.bl.uk/cgi-bin/pring.cgi?url=/collections/treasures/digitisation.html, Sep. 22, 2003, The British Library—The world's knowledge.

Stuart K. Card, George G. Robertson, and William York, The WebBook and the Web Forager: An Information Workspace for the World-Wide Web, 10 pgs., 1996.

* cited by examiner

SYSTEMS AND METHOD FOR TURNING PAGES IN A THREE-DIMENSIONAL ELECTRONIC DOCUMENT

BACKGROUND OF THE INVENTION

1. Field of Invention

This invention generally relates to systems and methods for representing three-dimensional documents.

2. Description of Related Art

Techniques for creating virtual books, magazines, journals, textbooks, photograph albums, or the like, that attempt to simulate the appearance and functions of actual physical books, magazines, journals, textbooks, photograph albums, or the like, are highly desirable to the readers and viewers of these documents. These virtual books can be displayed by electronic books, i.e. e-book systems, personal computers (PCs), personal digital assistants (PDAs), or the like.

Many e-book systems, PCs, PDAs, or the like display virtual books in a two-dimensional ("2D") manner or a three-dimensional ("3D") manner. For example, B. Harrison describes several 2D-based e-book devices in "E-Books and the Future of Reading", IEEE Computer Graphics and Applications, Vol. 10, No. 3, pages 32-39. However, displaying virtual books in a 3D manner provides a more realistic appearance of an actual physical book.

Modern graphics systems make it possible to represent virtual books on a computer screen creating a 3D appearance of physical books. Such 3D virtual books have many potential uses, such as, for example, the representation of historical manuscripts, the representation in electronic bookstores of books for sale, electronic book publishing, the basis of new forms of medical textbooks and other enhanced book formats, new forms of laboratory journals, or photograph albums. Although displaying virtual books in a 3D manner provides a better representation of an actual physical book compared to a virtual book displayed in 2D, there are several important issues that need to be addressed.

These issues include: 1) how to represent a closed book with either the front cover or the back cover visible; 2) how to represent an opened book with two adjacent pages visible; and 3) how to represent turning the pages of the book forwards or backwards. Page turning is particularly important to give the readers and viewers the impression of reading or viewing an actual physical book. Since page turning is a dynamic animation that not only starts, but also finishes with the book in a static opened or closed position, how the static positions of the book are represented affects, to a large degree, how the book should be represented during the page turning animation, and vice versa.

There are various e-book systems displaying electronic documents in a 3D manner. For example, U.S. Pat. No. 6,340,980 describes a special user interface device mimicking an actual physical book. When connected to a computer, this device works like any other user interface device such as a mouse. A software product, known as the Flip Browser®, has been developed by eBook Systems Inc., and can be found at http://www.flipbrowser.com.

Additionally, U.S. patent application 20020035697 describes systems and methods for distributing and viewing electronic documents. A software product, known as the Zinio Reader®, has been developed by Zinio Systems Inc., and can be found at http://www.zinio.com. Another system, the Turning the Pages® system is based on a multimedia authoring product called Macromedia. The Turning the Pages® system is jointly developed by the British Library and Armadillo Systems, and can be found at http://www.bl.uk/whatson/exhibitions/lindisfarne/ttp.html. Although the above describe and/or display electronic documents in a 3D manner, the disclosures regarding the page turning feature for virtual books displayed in a three-dimensional manner are limited to little or no detail of how the page turning features are designed or implemented.

U.S. Pat. Nos. 5,847,709 and 5,838,326 describe yet another system, commercially known as the WebBooks® developed by Xerox Corporation, for displaying electronic documents in a three-dimensional manner. Although the page turning animation of the WebBook® appears very similar to the page turning of an actual physical book, there are several drawbacks.

For example, an opened virtual book only models the top faces of the book, not the back side. Therefore, in a virtual environment where the back side or bottom faces, such as, for example, the front and back covers, of an opened virtual book is visible to the virtual camera, the virtual book no longer resembles an actual physical book. Thus, transitioning between a closed book and an opened book requires changing between the closed book representation and the opened book representation.

Additionally, WebBooks® include a page ruffling technique that simulates the multiple concurrent turning of a set of pages of the WebBook®. The pages to be turned are represented by multiple turning pages blocks. However, although the page ruffling technique provides the capability to rapidly scan through a set of pages for information of interest, the ruffling technique requires that the textures of all of the pages being turned to be displayed. Therefore, in WebBook®, all of the page textures are pre-loaded and stored in the main memory. Pre-loading and storing all of the page textures in the main memory severely limits the scalability of the system restricting the number of pages allowed in a virtual book. Furthermore, it is difficult to determine, even approximately, the amount of pages being turned during the page ruffling. Thus, other three-dimensional books have provided other solutions to resolve some of these drawbacks.

SUMMARY OF THE DISCLOSURE

It would therefore be desirable to implement a page turning feature in a virtual book displayed in 3D that better represents the turning of pages of actual physical books, magazines, journals, textbooks, photograph albums, or the like.

This invention provides systems and methods that allow the pages of 3D virtual books to be turned forwards or backwards in a manner that accurately represents turning pages of an actual physical book.

This invention separately provides systems and methods that allow the pages being turned to be merged with the pages located in the left side or the right side of the opened 3D virtual books without producing a visual discontinuity.

This invention separately provides systems and methods that provide constant relative distances between a virtual camera, located at a static position above a 3D virtual book, and the top pages of the 3D virtual book.

This invention separately provides systems and methods that allow top pages located on a left side pages block and a right side pages block of a 3D virtual book to appear the same in size.

This invention separately provides systems and methods that allow a left side pages block, a right side pages block and/or a turning pages block of a 3D virtual book to be modeled as a 3D object having 6 faces including top, bottom, left, right, front, and back faces.

This invention separately provides systems and methods that allow any face of a left side pages block, a right side pages block and a turning pages block of a 3D virtual book to be modeled as a flat surface.

This invention separately provides systems and methods that allow any face of a left side pages block, a right side pages block, and/or a turning pages block of a 3D virtual book to be modeled as a parallelogram.

This invention separately provides systems and methods that allow any face of a left side pages block, a right side pages block and a turning pages block of a 3D virtual book to be modeled as a curved surface.

This invention separately provides systems and methods that allow a left side pages block and a right side pages block of a 3D virtual book to be moved relative to a top face base line.

This invention separately provides systems and methods that allow a turning pages block of a 3D virtual book to be moved relative to a top face base line.

This invention separately provides systems and methods that associate textures of multiple resolutions with pages of a 3D virtual book.

This invention separately provides systems and methods that apply low-resolution textures of pages of a 3D virtual book during a page turning animation.

This invention separately provides systems and methods that apply high-resolution textures of pages of a 3D virtual book during a static state.

This invention separately provides systems and methods that avoid re-sampling when an image is first applied as a texture on a page.

This invention separately provides systems and methods that enhance the scalabilty of the system.

This invention separately provides systems and methods that model a 3D virtual book to resemble an actual physical book as viewed by a virtual camera from any angle.

In various embodiments of the systems and methods according to this invention, the pages of a 3D virtual book can be turned forwards or backwards in a manner that accurately represents turning pages of an actual physical book. In various exemplary embodiments, the pages of the 3D virtual book are modeled as parallelograms. In various exemplary embodiments, the pages being turned are merged with the pages located in the left side or the right side of the opened 3D virtual book without producing a visual discontinuity.

In various exemplary embodiments of the systems and methods according to this invention, the top, bottom, left, right, front and/or back faces of a left side pages block, a right side pages block, and a turning pages block of the 3D virtual books are modeled as curved surfaces.

In various exemplary embodiments of the systems and methods according to this invention, a virtual camera is located at a static position above a 3D virtual book. In various exemplary embodiments, constant relative distances between the virtual camera and the top pages of the 3D virtual book are maintained. In various exemplary embodiments, the top pages of a left side pages block and a right side pages block appear the same in size as viewed from the virtual camera.

In various exemplary embodiments, a closed 3D virtual book is modeled as a left side pages block or a right side pages block, and an opened 3D virtual book is modeled as a left side pages block and a right side pages block representing the left side and the right side of an opened book with respect to the binding. When the book is opened, these two blocks are connected at their top faces that lie on a top face base line. At the beginning of turning the pages, another 3D object representing a turning pages block, located between the left and right side pages blocks, is created in order to represent the portion of the pages being turned. Throughout the animation of turning the pages, the left side pages block, the turning pages block and the right side pages block rotate, translate, and/or deform gradually relative to the top face base line while maintaining the same points of connection to produce a realistic effect of turning pages in a book. At the end of the page turning animation, the turning pages block is merged into either the left side pages block or the right side pages block of the virtual book to return the book to a static state.

In various exemplary embodiments of the systems and methods according to this invention, pages of 3D virtual books are displayed in textures of multiple resolutions. In various exemplary embodiments, the top face of the left side pages block, the top face of the right side pages block and the top and bottom faces of the turning pages block are displayed in low-resolution page textures during a page turning animation. In various exemplary embodiments, the top faces of the left and right side pages blocks are displayed in high-resolution page textures during a static state.

In various exemplary embodiments of the systems and methods according to this invention, re-sampling is avoided when an image is first applied as a texture on a page.

These and other features and advantages of this invention are described in or are apparent from the following detailed description of the systems and methods according to this invention.

BRIEF DESCRIPTION OF THE DRAWINGS

Various exemplary embodiments of the systems and methods according to this invention will be described in detail, with reference to the following figures, wherein.

DETAILED DESCRIPTION OF EXEMPLARY EMBODIMENTS

Figure 1:
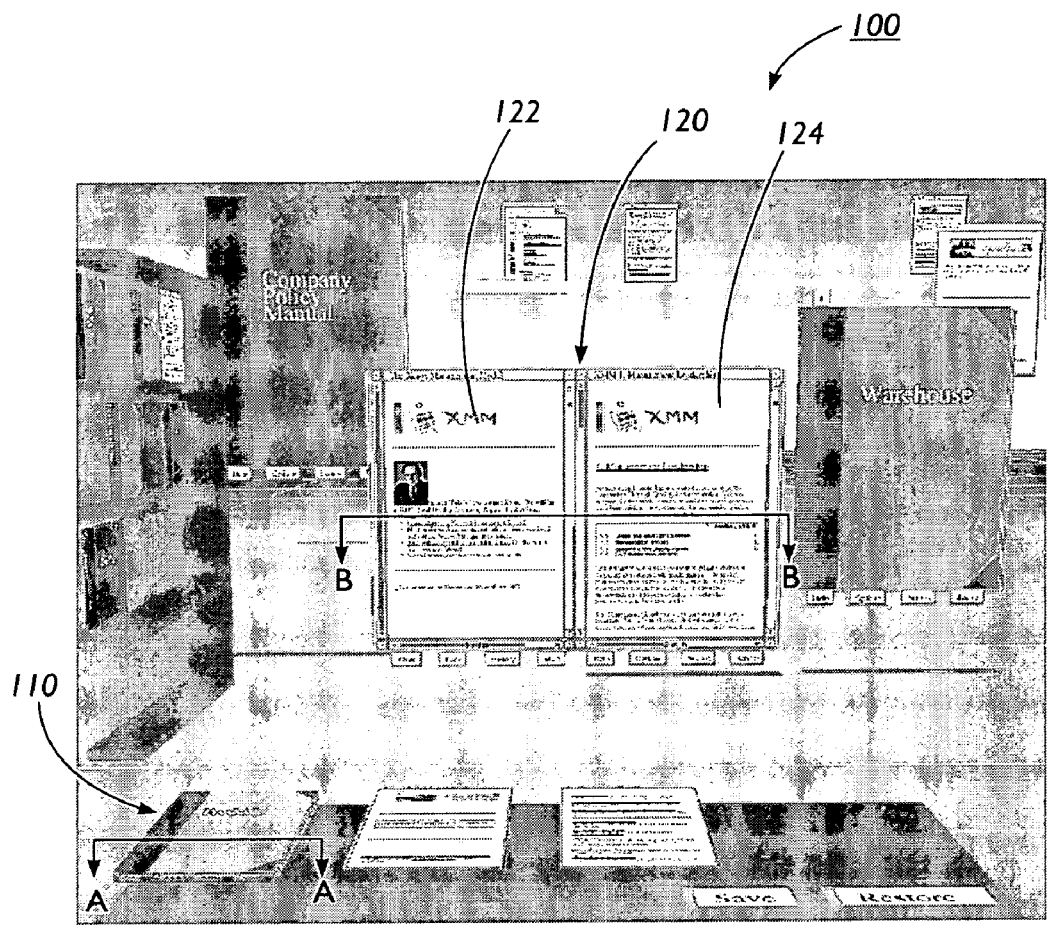
FIG. 1 illustrates one embodiment of a standard virtual environment containing one embodiment of standard three-dimensional electronic books displayed in both an opened position and a closed position.

Although the page turning techniques of standard 3D virtual books appear similar to the page turning of actual physical books, there are several shortcomings in the page turning features. For example, as shown in FIG. 1, a standard virtual environment 100 containing 3D virtual books, such as Web-Books®, looks reasonably realistic when a closed virtual book 110 or the top faces 122,124 of an opened virtual book 120 are viewed with a static camera. In WebBooks®, a closed virtual book 110 models both the top face and the bottom face of the book, while an opened virtual book 120 only models the top faces 122,124 of the book.

Figure 2:
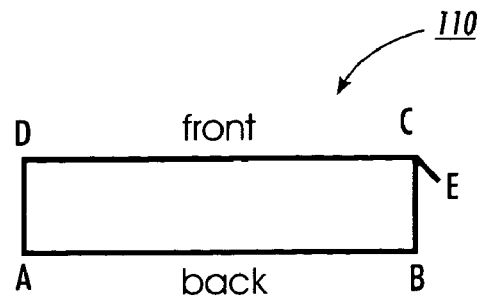
FIG. 2 illustrates a standard modeling of the embodiment of the standard three-dimensional electronic book of FIG. 1 in a closed position.
Figure 3:
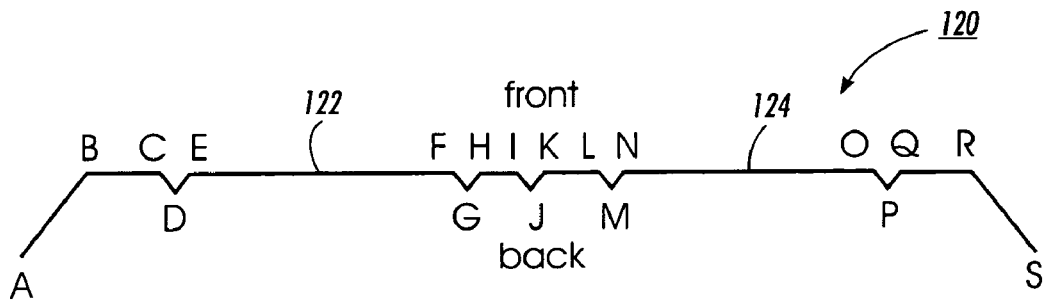
FIG. 3 illustrates a standard modeling of the embodiment of the standard three-dimensional electronic book of FIG. 1 in an opened position.

FIG. 2 shows the cutting plane of a closed WebBook®, taken at line A-A in FIG. 1, as a rectangular box ABCD with a thickness indicator CE, and FIG. 3 shows the cutting plane of an opened WebBook®, taken at line B-B in FIG. 1, as line A-S, respectively. The book cutting plane is where the book is cut in half in a direction perpendicular to a book binding that connects the pages of the book together. As shown in FIG. 3, the opened virtual book 120 only models the top faces 122, 124 of the book, not the back side. Therefore, in a virtual environment where the back side or bottom faces, such as, for example, the front and back covers, of an opened virtual book is visible to the virtual camera, the virtual book no longer resembles an actual physical book. Further, transitioning between a closed book 110 and an opened book 120 requires changing between the closed book representation of FIG. 2 and the opened book representation of FIG. 3.

Figure 4:
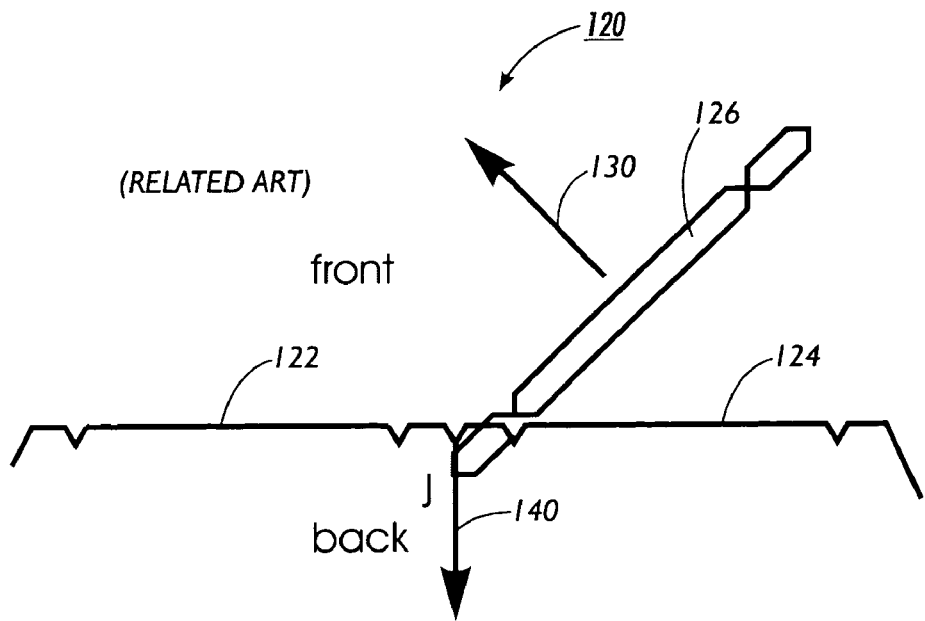
FIG. 4 illustrates a standard modeling of the embodiment of the standard three-dimensional electronic book of FIG. 1 including a standard page turning method and system to rotate a standard turning pages block.

FIG. 4 shows the modeling of a turning pages block 126 representing the pages of the WebBook® being turned. As the turning pages block 126 rotates in the direction of arrow 130, point J moves in the direction of arrow 140 until the turning pages block has turned 90 degrees from an initial starting position. Point J then travels back in a direction opposite to arrow 140 until the turning pages block 126 has rotated 180 degrees from the initial starting position.

The WebBook® also includes a page ruffling technique (not shown) that simulates the multiple concurrent turning of a set of pages of the WebBooks®. The pages to be turned are represented by multiple turning pages blocks. However, although the page ruffling technique provides the capability to rapidly scan through a set of pages for information of interest, the ruffling technique requires that the textures of all of the pages being turned to be displayed. Therefore, in WebBook® all of the page textures are pre-loaded and stored in the main memory. Pre-loading and storing all of the page textures in the main memory severely limits the scalability of the system, restricting the number of pages allowed in a virtual book. Furthermore, it is difficult to determine, even approximately, the amount of pages being turned during the page ruffling.

Figure 5:
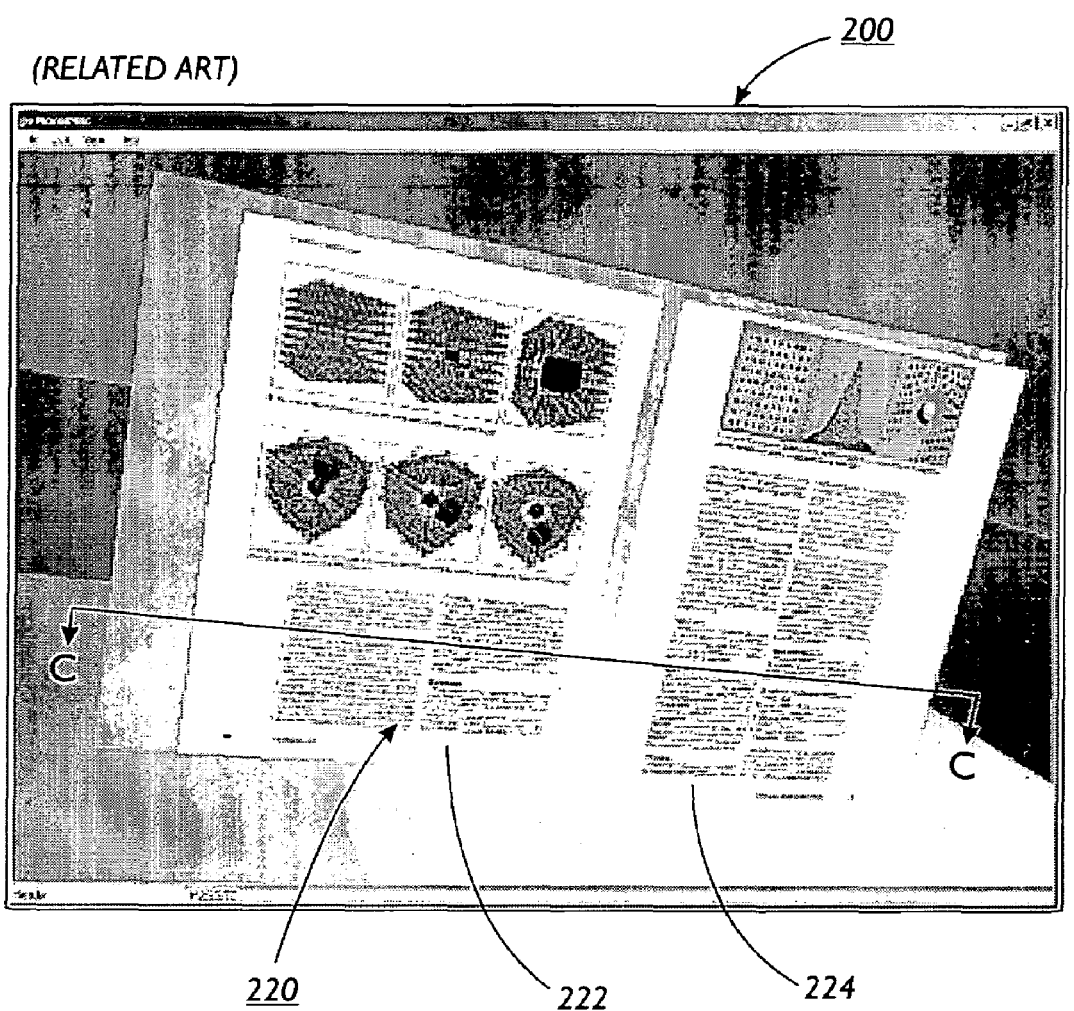
FIG. 5 illustrates another embodiment of a standard virtual environment containing another embodiment of a standard three-dimensional electronic book in an opened position.
Figure 6:
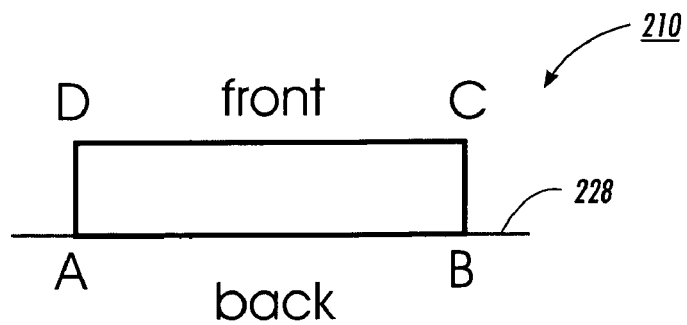
FIG. 6 illustrates another embodiment of a standard modeling of the standard three-dimensional electronic book of FIG. 5 in a closed position.

Other three-dimensional virtual books have also attempted to model turning the pages of an actual physical book. For example, FIG. 5 shows a standard virtual environment 200 containing a standard three-dimensional virtual book in an opened position 220 with pages on the left and right sides 222, 224. FIG. 6 shows the cutting plane, of the standard three-dimensional electronic book in a closed book position 210, as a rectangle ABCD. The virtual book also has a static base line 228 located at a bottom plane AB of the closed book 210 which is used during page turning as a static reference line that assists in determining the relative movement of the pages of the virtual book.

Figure 7:
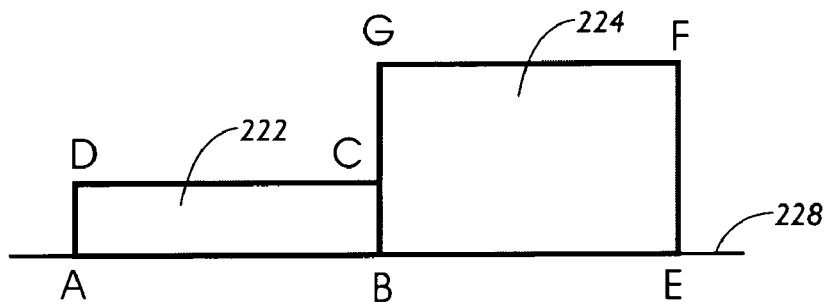
FIG. 7 illustrates another embodiment of a standard modeling of the standard three-dimensional electronic book of FIG. 5 in an opened position.

FIG. 7 shows the cutting plane, taken at line C-C in FIG. 5, of the three-dimensional book in the opened position 220. As shown in FIG. 7, an opened virtual book is modeled as at least a left side pages block 222 and a right side pages block 224 represented by rectangular polygons ABCD and BEFG, respectively. The static base line 228, now located at a bottom plane ABE of the opened book 220, is used during page turning as a static reference line that assists in determining the relative movement of the pages of the virtual book.

Figure 8:
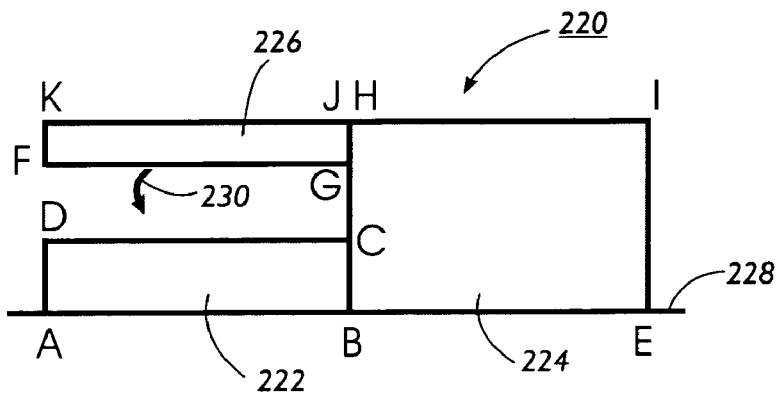
FIG. 8 illustrates another embodiment of a standard modeling of the standard three-dimensional electronic book of FIG. 5 including another standard page turning method and system to rotate another standard turning pages block.

FIG. 8 shows the modeling of a turning pages block 226 representing the pages of the virtual book being turned. During the page turning animation, the bottom faces AB,BE of the left side pages block 222 and the right side pages block 224 remain stationary on the base line 228, and the turning pages block 226 rotates in the direction of arrow 230 around the connection point J,H. However, modeling the three-dimensional virtual book as rectangles positioned relative to the bottom face base line 228 contains several drawbacks.

First, the dropping of the turning pages block 226 at the end of the animation leads to strong visual discontinuity. Second, as the virtual book is turned from one page to another, the locations of the top faces of the left side pages block 222 and the right side pages block 224 change dynamically. This means that the relative distances between a static camera and the top pages of the virtual book are not constant, which makes the top pages of the opened book appear as different sizes depending on which two pages are being displayed.

The following detailed discussion is directed to specific applications, namely three-dimensional electronic books, with which the page turning systems and methods according to this invention are usable. However, it should be appreciated that this is for the ease of understanding and familiarity only, and should not be interpreted as limiting the types of applications with which the systems and methods according to this invention are usable.

Figure 9:
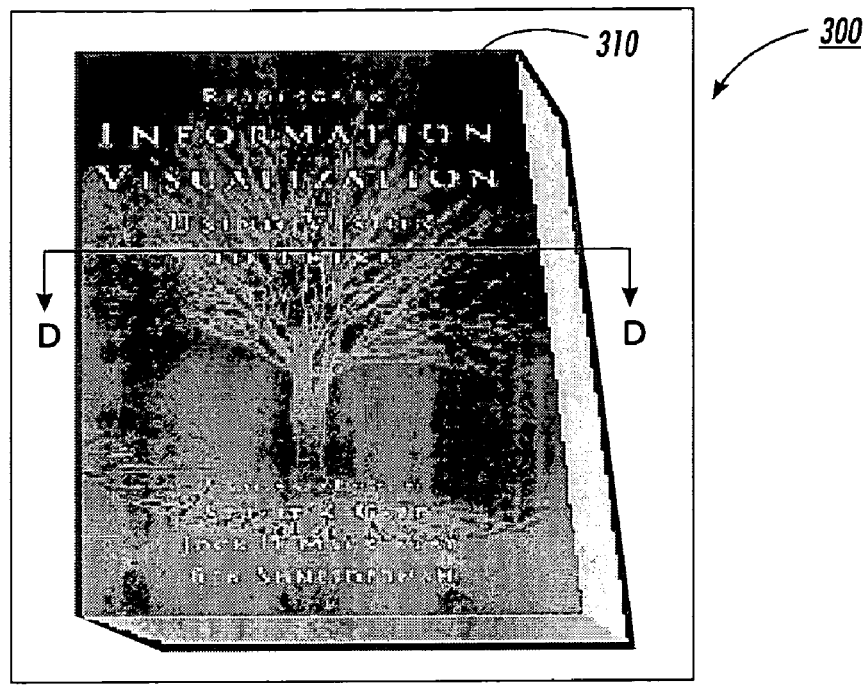
FIG. 9 illustrates one exemplary embodiment of a virtual environment containing one exemplary embodiment of a closed three-dimensional electronic book having one exemplary embodiment of the method and systems for turning pages according to this invention.
Figure 10:
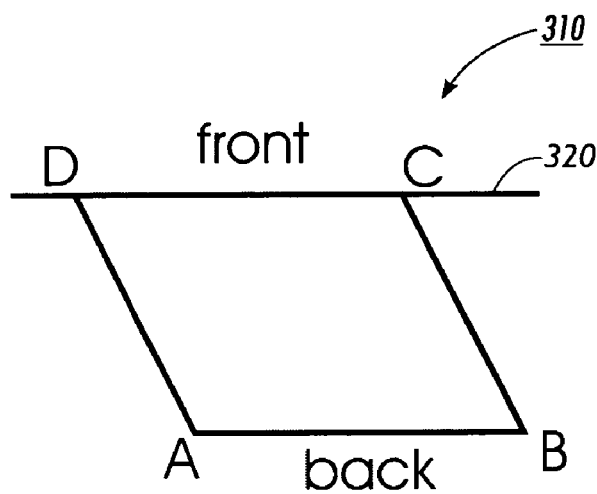
FIG. 10 illustrates the modeling of the exemplary embodiment of the three-dimensional electronic book of FIG. 9 in the closed position using one exemplary embodiment of the method and systems for turning pages according to this invention.

FIG. 9 illustrates one exemplary embodiment of a virtual environment containing one exemplary embodiment of a three-dimensional electronic book 300 in a closed position 310. FIG. 10 illustrates the cutting plane of the exemplary embodiment of the three-dimensional electronic book of FIG. 9 taken at line D-D. Since the length of the virtual book 300 is the length of an individual page such as, for example, the distance between the top of the page and the bottom of the page, the length of the virtual book 300 remains constant throughout the page turning animation and will not be further mentioned.

As illustrated in FIG. 10, the closed book 310 is represented as a parallelogram ABCD. The width of the book such as, for example, the length of lines AB and DC, is determined by the width of an individual page. The thickness of the book, i.e., the distance between AB and DC, is determined by the thickness of an individual page and the number of pages in the book. The slanting angles ABC and ADC are predefined constants. The virtual book 300 also has a static base line 320, located at a top plane DC of the closed book 310, which is used during page turning as a static reference line that assists in determining the relative movement of the pages of the virtual book 300.

Figure 11:
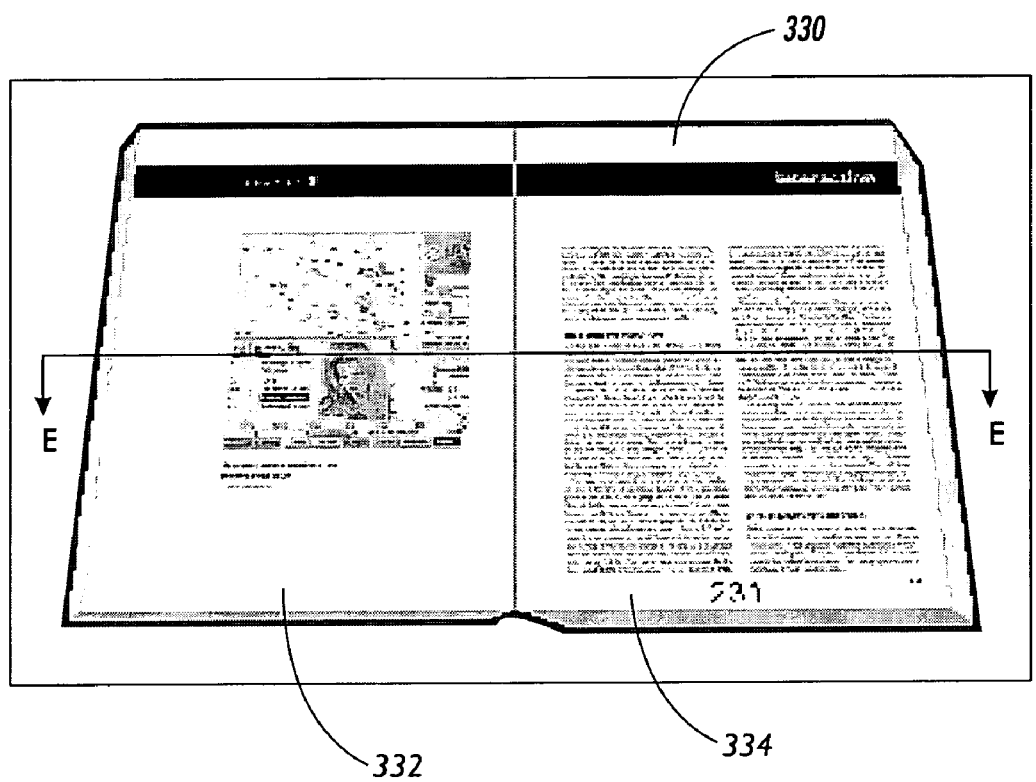
FIG. 11 illustrates another exemplary embodiment of a virtual environment containing one exemplary embodiment of an opened three-dimensional electronic book using one exemplary embodiment of the method and systems for turning pages according to this invention.
Figure 12:
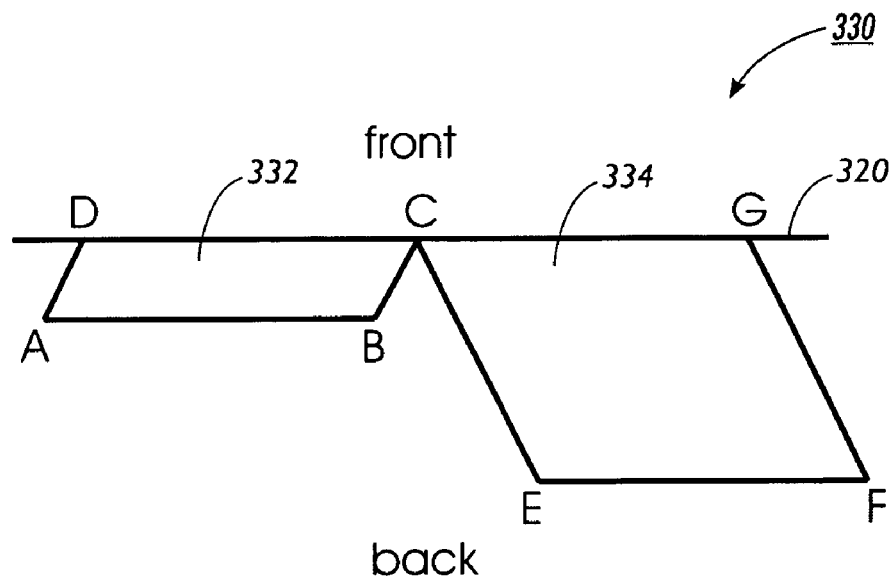
FIG. 12 illustrates a static state modeling of one exemplary embodiment of the method and systems for turning pages of the exemplary embodiment of the three-dimensional electronic book of FIG. 11 according to this invention.

FIG. 11 illustrates one exemplary embodiment of the three-dimensional electronic book 300 of FIG. 9 in an opened position 330 and displays the three-dimensional electronic book 300 in a perspective view showing the thickness of the left side 332 and the right side 334 of the book 300. The thickness of the left side 332 and right side 334 of the book 300 represents the number of pages on the left and right sides 332,334 of the opened book 330, respectively. FIG. 12 illustrates the cutting plane, taken at line E-E in FIG. 11, of the exemplary embodiment of the three-dimensional electronic book 300 in the opened position 330.

As illustrated in FIG. 12, a static state of the exemplary embodiment of the three-dimensional electronic book 300 in the opened position 330 of FIG. 11 is modeled as including at least two pages blocks. Specifically, the left side pages block 332 is represented by a parallelogram ABCD, and the right side pages block 334 is represented by another parallelogram EFGC. The left side pages block 332 and the right side pages block 334 connect at the point C. Similar to the virtual book 300 in the closed position 310, the width of the left side pages block AB and the width of the right side pages block EF are determined by the width of an individual page. Also, similar to the virtual book 300 in the closed position 310, the thickness of the left side pages block, i.e., the distance between AB and DC, and the thickness of the right side pages block, i.e., the distance between EF and CG, are determined by the thickness of an individual page and the number of pages in each of the blocks. The static base line 320 of the virtual book 300 is located at a top plane DCG of the opened book 330 and used during page turning as a static reference line that assists in determining the relative movement of the pages of the virtual book 300.

The dimensions mentioned above are intrinsic properties of the book calculated and/or determined by various methods and systems well known to those skilled in the art. For example, since a length, a width and a thickness of an individual page of the closed virtual book are predetermined, a thickness of the closed virtual book is also predetermined as the total number of pages in the closed virtual book multiplied by the thickness of the individual page. Additionally, since the number of pages in the left side pages block and the right side pages block during the static state of FIG. 12 is predetermined, the coordinates or points of the left side pages block and the right side pages block relative to the static base line are also predetermined. Further, the location of the virtual book in the virtual environment is also predetermined. Since many dimensions and coordinates are predetermined, when a book is selected by the viewer for viewing, the geometry of the book, such as, for example, the coordinates of the points of the blocks in FIG. 10 and FIG. 12 is already predetermined. Further, the location of the static base line is predetermined. Therefore, the viewer only selects a virtual book to be viewed, and a number of pages of the virtual book to turn forwards or backwards.

The following detailed description illustrates one exemplary embodiment of a sequence of positions of the pages as the pages are being turned according to one exemplary embodiment of the methods for turning pages of the exemplary embodiments of the three-dimensional electronic book 300 of FIG. 9.

Although the following exemplary embodiments illustrates turning pages of a virtual book forwards in a counterclockwise direction, it should be appreciated that the pages of the virtual book can also be turned in a backward clockwise direction using the exemplary method of turning pages. It should also be appreciated that one or more pages of a book can be turned at the same time.

Before turning the pages of the book forwards in a counterclockwise direction, the number of pages to be turned is determined. The page turning system determines a portion, representing the number of pages to be turned, of the right side pages block 334 that needs to be turned from the right side of the book to the left side of the opened virtual book 330.

Figure 13:
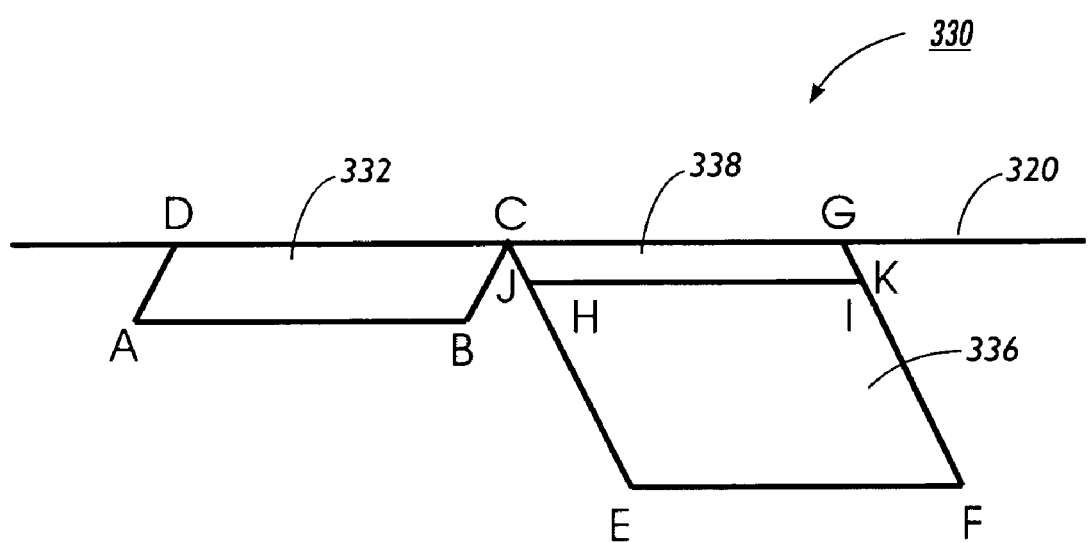
FIG. 13 illustrates one exemplary embodiment of the method and systems for turning pages of the exemplary embodiment of the three-dimensional electronic book of FIG. 12 including one exemplary embodiment of a turning pages block at the beginning of forwarding pages according to this invention.
Figure 14:
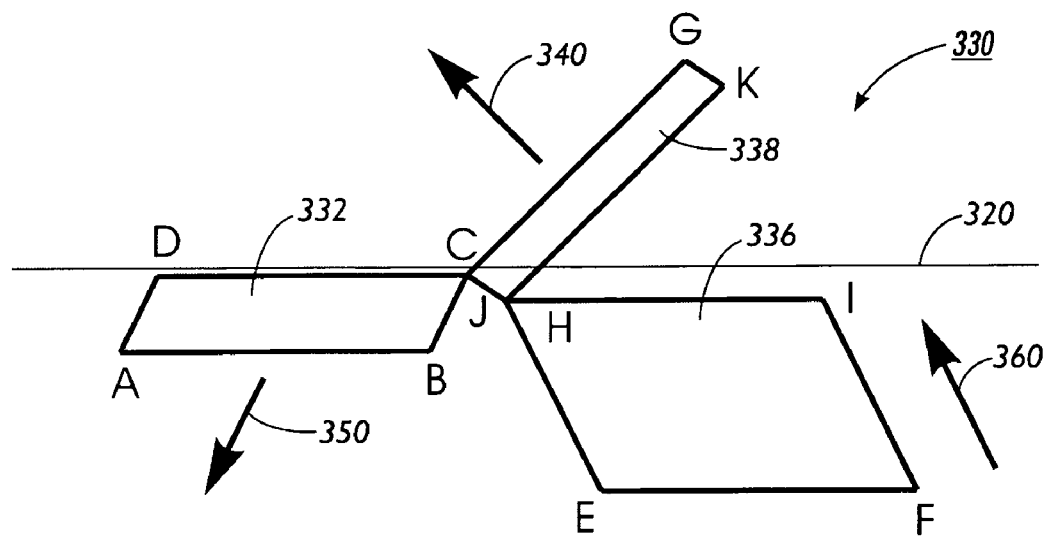
FIG. 14 illustrates one exemplary embodiment of the method and systems for turning pages of the exemplary embodiment of the three-dimensional electronic book of FIG. 13 rotating the turning pages block 45 degrees counter-clockwise according to this invention.
Figure 15:
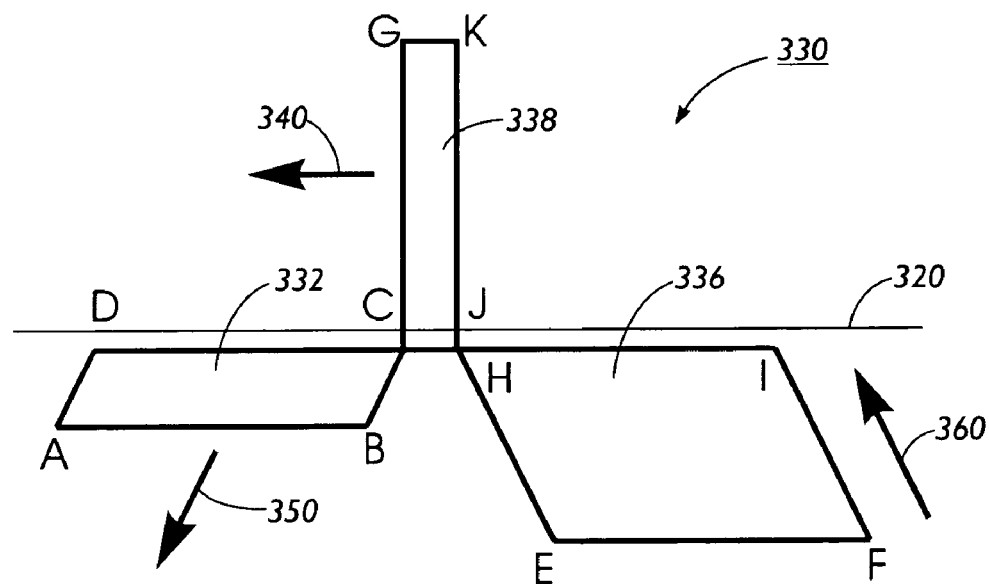
FIG. 15 illustrates one exemplary embodiment of the method and systems for turning pages of the exemplary embodiment of the three-dimensional electronic book of FIG. 14 rotating the turning pages block another 45 degrees counter-clockwise according to this invention.
Figure 16:
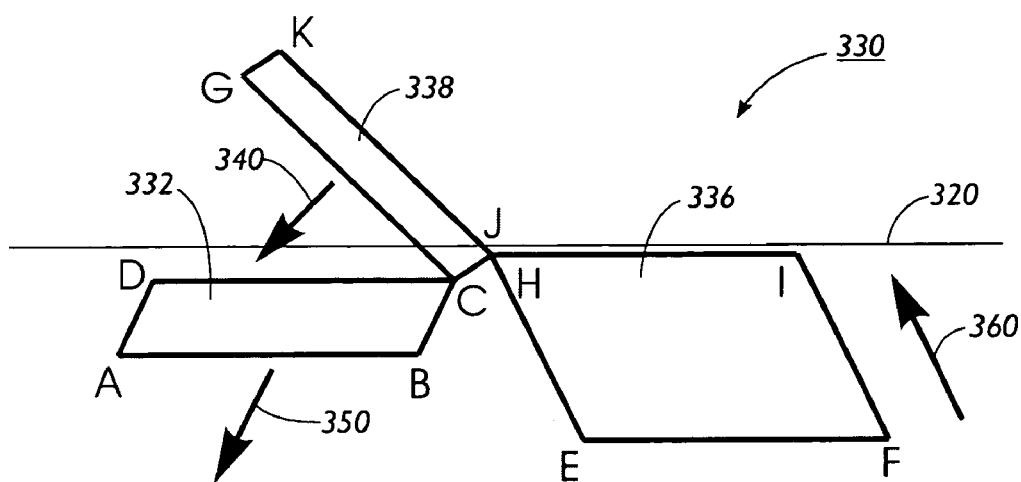
FIG. 16 illustrates one exemplary embodiment of the method and systems for turning pages of the exemplary embodiment of the three-dimensional electronic book of FIG. 15 rotating the turning pages block another 45 degrees counter-clockwise according to this invention.

FIG. 13 illustrates the beginning of the page turning animation of the virtual book 330 with the pages in an initial page turning position. First, the right side pages block 334 is split into a first portion representing the number of pages to be turned and a second portion representing the pages that remain in the right side pages block after the first portion has been removed. The first portion is a turning pages block 338 represented by the parallelogram JKGC. The thickness, i.e., the distance between lines JK and CG, of the turning pages block 338 is determined by multiplying the number of pages to be turned and the thickness of an individual page. Further, the second portion, a new right side pages block 336 represented by parallelogram EFIH, illustrates the difference between the previous right side pages block 334 and the turning pages block 338. Finally, the top face DC of the left side page block 332 and the top face CG of the turning pages block 338 are co-linear with the static base line 320.

In addition, low-resolution such as, for example, 256×256, page textures corresponding to the top face CG and the bottom face JK of the turning pages block 338 are loaded from the hard drive of a computer system or the like and applied to the top face CG and bottom face JK, respectively. Likewise, a low-resolution texture corresponding to the top face HI of the new right side pages block 336 is loaded from the hard drive of a computer system or the like and applied to the top face accordingly. At the same time, two separate programming threads are started to load high-resolution (e.g. 512×512) page textures corresponding to the top face HI of the new right side pages block 336 and the bottom face JK of the turning pages block 338, respectively.

FIGS. 14-17 illustrate exemplary embodiment of the 180 degrees counter-clockwise rotation of the turning pages block 338 in which the turning pages block has rotated 45, 90, 135, and 180 degrees counter-clockwise, respectively, with regard to the initial starting position of FIG. 13. During the rotation of the turning pages block 338, the top face DC of the left side pages block 332 and the top face CG of the turning pages block 338 do no line up with the static base line 320. The following discussion describes the movement of the left side pages block 332, the right side pages block 336, and the turning pages block 338 in greater detail.

As illustrated in FIGS. 14-17, the turning pages block 338 rotates, in the direction of arrow 340, around the point J,H. At the same time, the point J,H starts to move towards the static base line 320 along an upward direction towards the position where the point C was located at the beginning of the animation, i.e. along the direction JC of FIG. 13. However, throughout the animation, the left side pages block 332 and the turning pages block 338 remain connected at the point C resulting in a downward translation 350 of the left side pages block 332 away from the static base line 320. Similarly, concurrent with the movement of the left side pages block 332, the right side pages block 336 and the turning page block 338 remain connected at the point J,H which results in an upward translation 360 of the right side pages block 336 towards the static base line 320.

Figure 17:
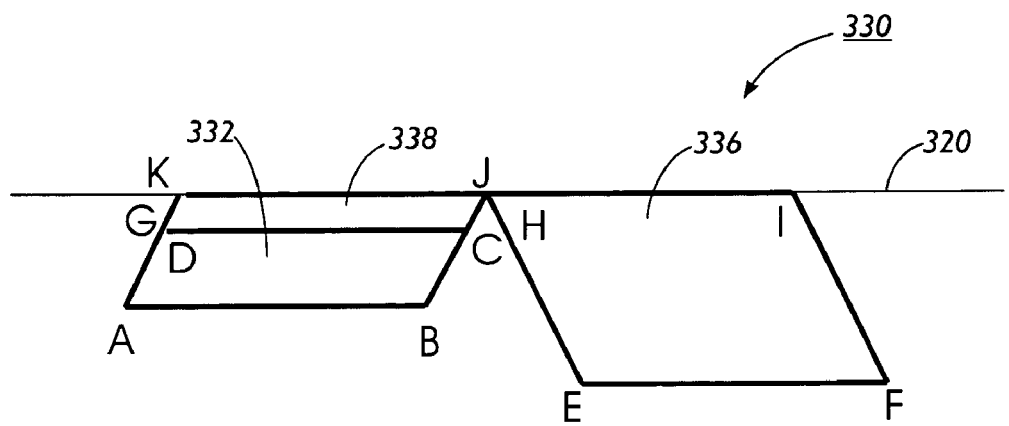
FIG. 17 illustrates one exemplary embodiment of the method and systems for turning pages of the exemplary embodiment of the three-dimensional electronic book of FIG. 16 rotating the turning pages block another 45 degrees counter-clockwise according to this invention.

As the page turning animation proceeds, the slanting angle CJK of the turning pages block 338 is gradually deformed, i.e., the slanting angle changes from an obtuse angle in FIG. 13 into an acute angle in FIG. 17. However, the thickness, i.e. the distance between lines CG and JK, of the turning pages block 338 remains constant.

As shown in FIG. 17, after the turning pages block 338 has rotated 180 degrees counter-clockwise from the initial page turning position, the side faces BC,AD of the left side pages block 332 becomes collinear with the side faces CJ,GK of the turning pages block 338, respectively. Additionally, the top face KJ of the turning pages block 338 and the top face JI of the right side pages block 336 are collinear with the static base line 320.

Figure 18:
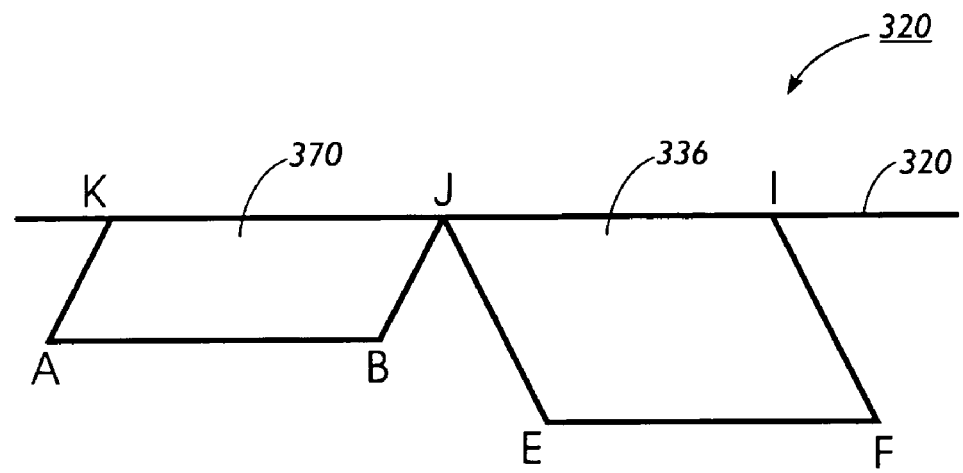
FIG. 18 illustrates one exemplary embodiment of the method and systems for turning pages of the exemplary embodiment of the three-dimensional electronic book of FIG. 17 at the end of rotating the turning pages block according to this invention.

FIG. 18 illustrates a modeling of the exemplary embodiment of the three-dimensional electronic book 300 in an opened position at the end of the page turning animation. As shown in FIG. 18, a new left side pages block 370 is created as a result of merging the turning pages block 338 with the left side pages block 332 of FIG. 17. Thus, the top face KJ of the new right side pages block 370 and the top face JI of the right side pages block 336 are collinear with the static base line 320.

In addition, the two programming threads started at the beginning of the page turning animation are checked to see if the two high-resolution textures corresponding to the top face KJ of the new left side pages block 370 and the top face JI of the right side pages block 336 have been loaded from the hard drive of a computer system or the like. If not, the threads are allowed to continue their executions. When the high-resolution textures are available, they are applied to replace the low-resolution textures on the top face KJ of the new left side pages block 370 and the top face JI of the right side pages block 336, respectively. The book then returns to a static state.

Figure 19:
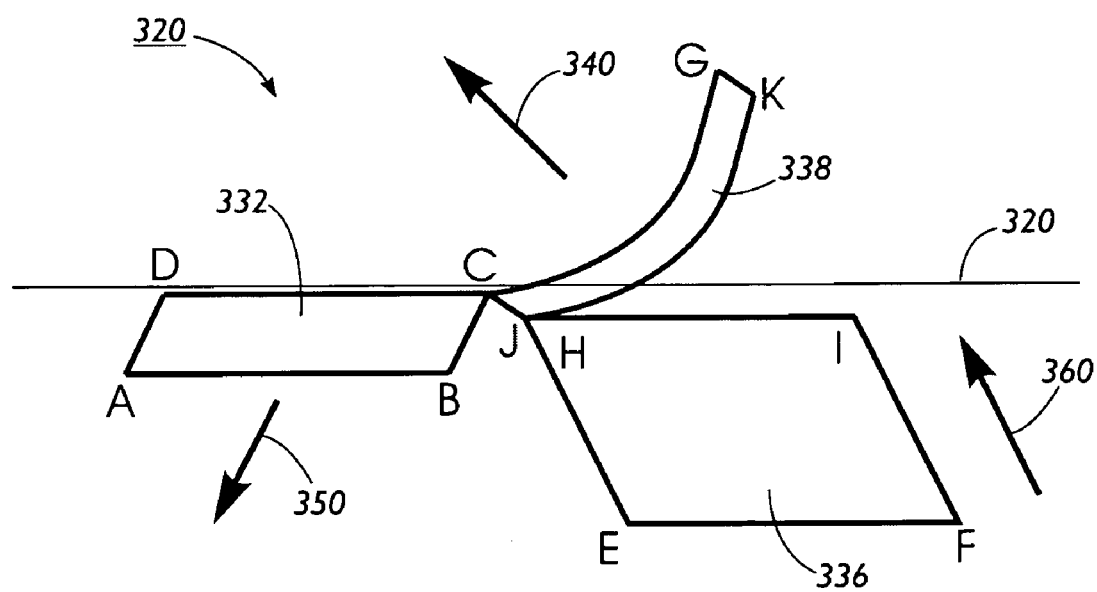
FIG. 19 illustrates another exemplary embodiment of an opened three-dimensional electronic book having another exemplary embodiment of the method and systems for turning pages according to this invention.

FIG. 19 illustrates another exemplary embodiment of modeling of the pages of the virtual book 300 during the page turning animation according to the systems and methods of this invention. During the page turning animation, the turning pages block 338 of the opened virtual book 330 is represented by a curved top face CG, a curved bottom face JK and two flat side faces JC and GK. This modeling of the turning pages block 338 provides a more realistic page turning effect. Further, page turning using this modeling can be similarly accomplished by modifying the methods for turning the pages as previously discussed with respect to FIGS. 12-18. However, the positions of the left side pages block 332, the right side pages block 336, the turning pages block 338, etc. are still determined relative to the static base line 320.

Although FIGS. 12-18 illustrate the pages of the virtual book as including a left side, a right side and a turning pages portion, each having one block enclosed with flat faces, it should be appreciated that the pages of the virtual book can be represented by more than three blocks, and the faces of the blocks can be represented by any shaped surfaces. It should be appreciated that other types of non-flat surfaces can also be used to model the faces of the left side pages block, the right side pages block, and/or the turning pages block. For example, in FIG. 19, the side faces CJ, GK of the turning pages block can also be represented as curved faces. Further, it should be appreciated that, if desired, multiple pages blocks can be used to represent the left side of the book, the right side of the book, and/or the turning pages of the book.

Since the static state of the closed virtual book 310 in FIG. 10 does not have a left or right side pages block, the static state of the closed virtual book 310 is considered as a special case of the static state of the opened virtual book 330 in FIG. 12. In other words, in the closed virtual book 310, one of the right side pages block and the left side pages block can be considered as invisible. Thus, transitioning between a closed book 310 and an opened book 330 is similar to the transitioning between an opened book 330 in the static state of FIG. 12 and the opened book 330 in the static state of FIG. 18 as described above. Therefore, turning pages of a virtual book from/to an initial/final static state closed position 310 will not be discussed in detail. Thus, a viewer can carry out the page turning operation starting from a static state closed book or an opened book placed in an virtual environment. In other words, page turning is a cycle starts from a book in a static state, such as, for example, FIG. 12, and goes through an animation as illustrated at FIG. 13 to FIG. 17, which returns the book back to another static state, such as, for example, FIG. 18.

Figure 20:
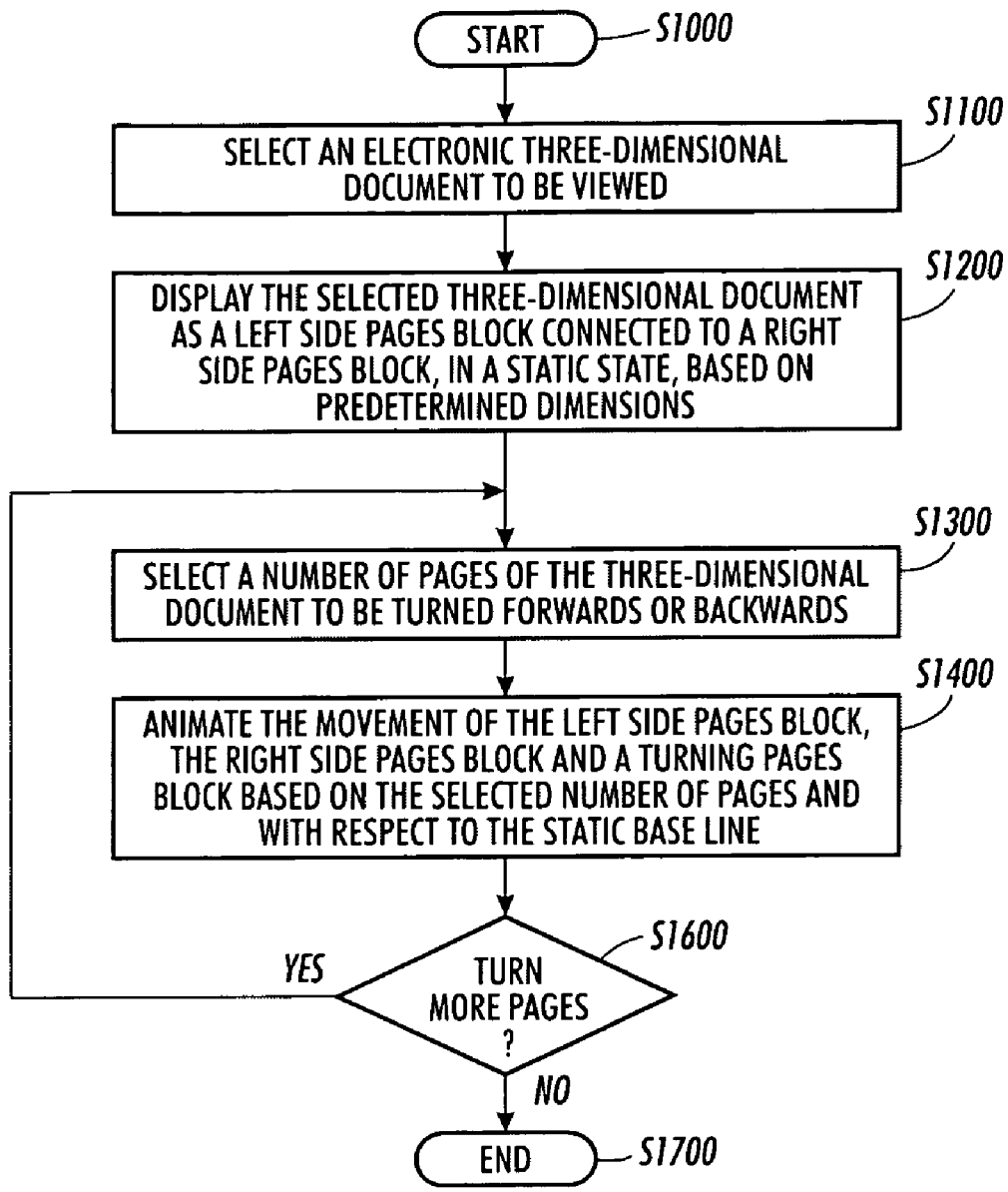
FIG. 20 is a flow chart outlining in greater detail one exemplary embodiment of the method for turning pages of a three-dimensional electronic document.

FIG. 20 is a flowchart outlining one exemplary embodiment of the method for representing turning pages of a three-dimensional virtual document. As shown in FIG. 20, operation of the method begins in step S1000, and continues to step S1100, where a three-dimensional to be viewed is selected by a viewer. Then, in step S1200, the selected three-dimensional document is displayed as a left side pages block connected to a right side pages block, in a static state, based on predetermined dimensions. Next, in step S1300, a number of pages to be turned, either forwards or backwards, is selected by the viewer. Operation then continues to step S1400.

In step S1400, the movement of the left side pages block, the right side pages block, and the turning pages block is animated based on the selected number of pages and with respect to the static base line. Then, in step S1600, a determination is made whether more pages are to be turned. If so, operation jumps back to step S1300. Otherwise, operation of the method continues to step S1700, where operation of the method ends.

Figure 21:
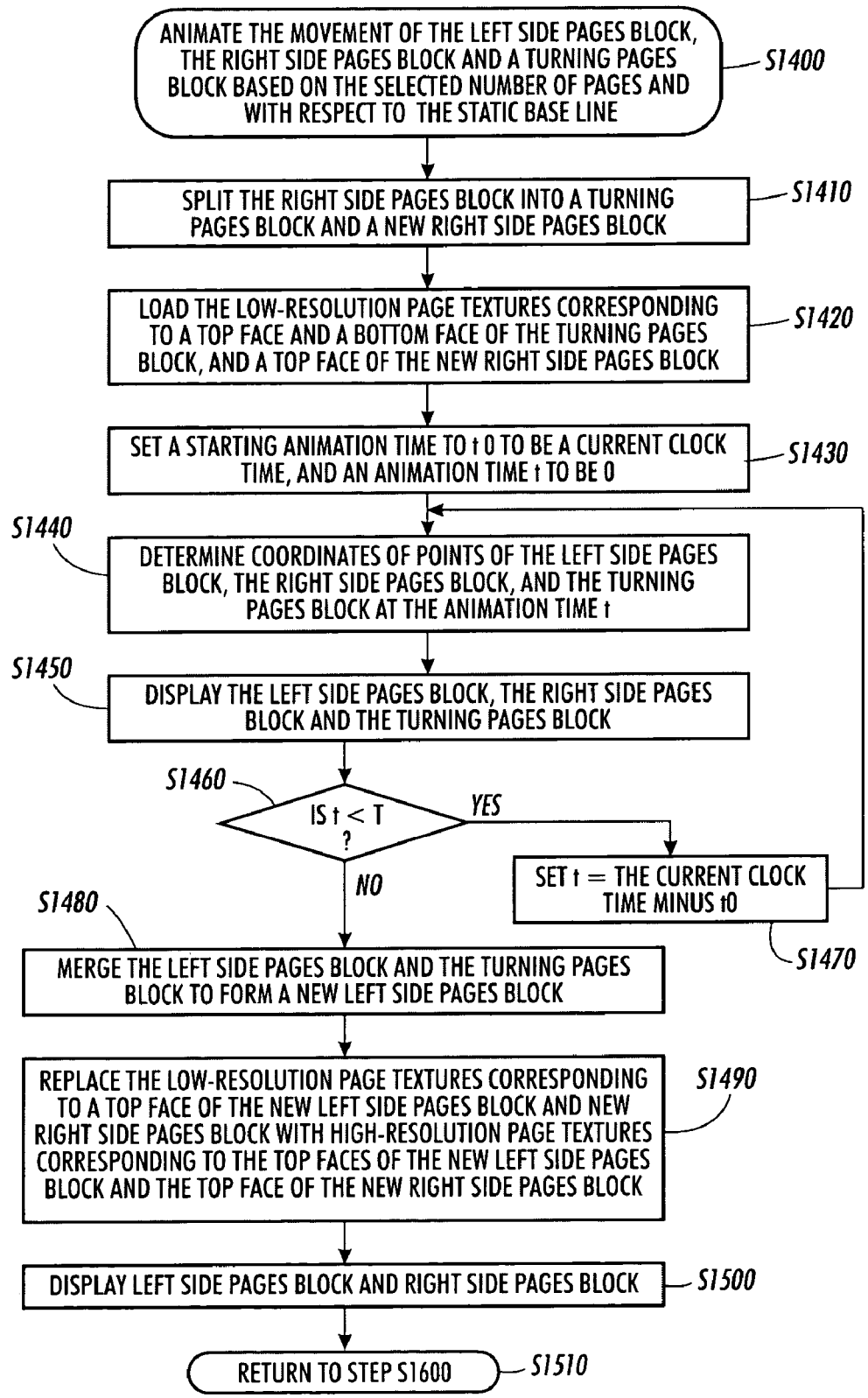
FIG. 21 is a flow chart outlining in greater detail one exemplary embodiment of the method for displaying the turning pages block with respect to the coordinates of the static base line of the opened three-dimensional electronic document of FIG. 20.

FIG. 21 is a flowchart outlining in greater detail one exemplary embodiment of the method for animating the movement of the left side pages block, the right side pages block and the turning pages blocks based on the selected number of pages and with respect to the static base line of FIG. 20 according to this invention. As shown in FIG. 21, operation of the method begins in step S1400, and continues to step S1410, where the right side pages block 334 is split into a turning pages block and a new right side pages block. As discussed previously with respect to FIG. 13, the turning pages block is a first portion representing the number of pages to be turned and the new right side pages block is a second portion representing the pages that remain in the right side pages block after the first portion has been removed. The thickness of the turning pages block is determined by multiplying the number of pages to be turned and the thickness of an individual page. Further, the thickness of the new right side pages block is the difference between the initial right side pages block and the turning pages block. Finally, the top face of the left side page block and the top face of the turning pages block remain co-linear with the static base line. Operation then continues to step S1420.

In step S1420, low-resolution page textures are loaded corresponding to a top face and a bottom face of the turning pages block, and a top face of the new right side pages block. As discussed previously with respect to FIG. 13, low-resolution such as, for example, 256×256, page textures corresponding to the top face and the bottom face of the turning pages block are loaded from the hard drive of a computer system or the like and applied to the top face and bottom face, respectively. Likewise, a low-resolution page texture corresponding to the top face of the new right side pages block is loaded from the hard drive of a computer system or the like and applied to the top face accordingly. At the same time, two separate programming threads are started to load high-resolution (e.g. 512×512) page textures corresponding to the top face of the new right side pages block and the bottom face of the turning pages block, respectively. Operation then continues to step S1430.

In step S1430, a starting animation time t0 is set to be a current clock time, and an animation time t is set to be 0. Then, in step S1440, coordinates of all points of the left side pages block, the right side pages block and the turning pages block are determined at animation time t. Next, in step S1450, the left side pages block, the right side pages block and the turning pages block are displayed. Operation then continues to step S1460.

In step S1460, a determination is made whether animation time t is less than a predetermined amount of time T. If so, operation continues to step S1470. Otherwise, operation jumps to step S1480. In step S1470, animation time t is set to be equal to the current clock time minus the starting animation time t0. Operation then jumps back to step S1440. In step S1480, the left side pages block and the turning pages block are merged to form a new left side pages block. As discussed previously with respect to FIG. 18, the new left side pages block is created as a result of merging the turning pages block with the initial left side pages block of FIG. 17. Thus, the top face of the new left side pages block and the top face of the new right side pages block are collinear with the static base line. Operation then continues to step S1490.

In step S1490, the low-resolution page textures corresponding to the top faces of the new left side pages block and the new right side pages block are replaced with high-resolution page textures corresponding to the top faces of the new left side pages block and the new right side pages block. As discussed with respect to FIG. 18, the two programming threads started at the beginning of the page turning animation are checked to see if the two high-resolution textures corresponding to the top face of the new left side pages block and the top face of the new right side pages block have been loaded from the hard drive of a computer system or the like. If not, the threads are allowed to continue their executions. When the high-resolution textures are available, they are applied to replace the low-resolution textures on the top face of the new left side pages block and the top face of the new right side pages block, respectively. Then, in step S1500, the left side pages block and the right side pages block are displayed. The book then returns to a static state. Operation then returns to step S1510, where operation of the method returns to step S1600.

Figure 22:
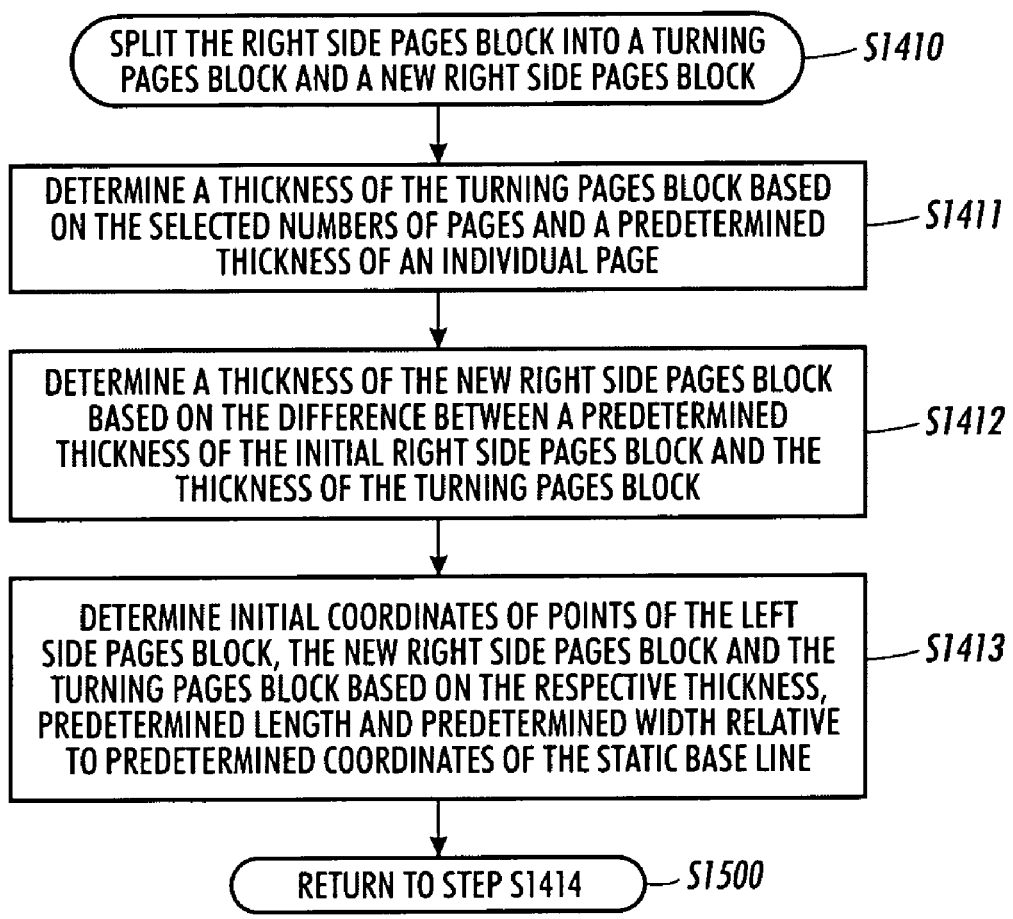
FIG. 22 is a flow chart outlining in greater detail one exemplary embodiment of the method for determining coordinates of all points of the left side pages block, the right side pages block and the turning pages block based on the selected number of pages and at N degrees relative to the initial coordinates of a first connection C connecting the left side pages block and the right side pages block in the static state of the opened three-dimensional electronic document of FIG. 21.

FIG. 22 is a flowchart outlining in greater detail one exemplary embodiment of the method for determining coordinates of points of the left side pages block, the right side pages block, and the turning pages block at animation time t=0 of FIG. 21 according to this invention. As shown in FIG. 22, operation of the method begins in step S1410, and continues to step S1411, where the thickness of the turning pages block is determined based on the selected number of pages to be turned and a predetermined thickness of an individual page. Then, in step S1412, the thickness of the new right side pages block is determined based on the difference between a predetermined thickness of the initial right side pages block and the thickness of the turning pages block. Next, in step S1413, initial coordinates of points of the left side pages block, the new right side pages block and the turning pages block based on the respective thickness, predetermined length and predetermined width are determined relative to predetermined coordinates of the static base line. Operation then continues to step S1414, where operation of the method returns to step S1420.

Figure 23:
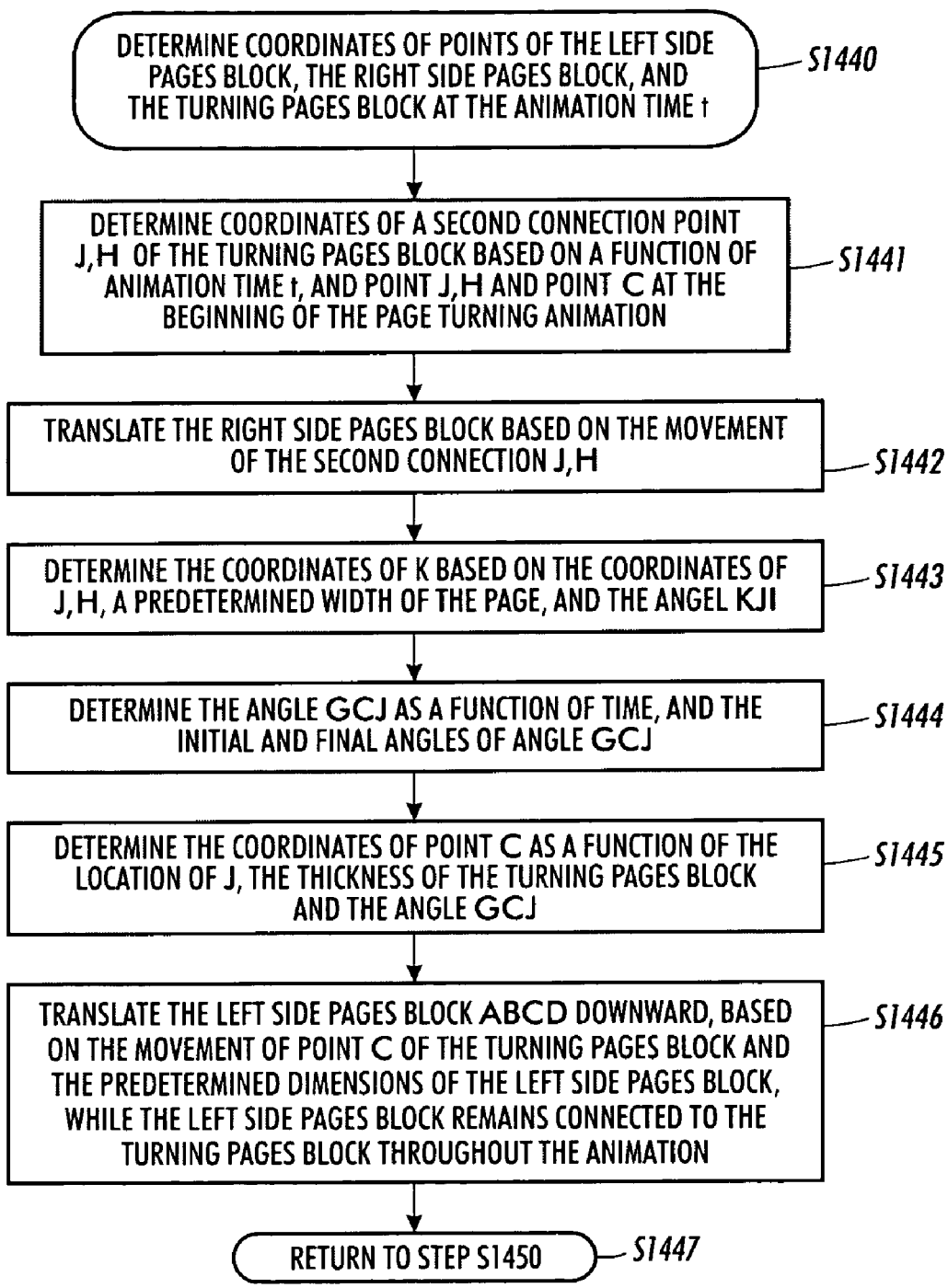
FIG. 23 is a flow chart outlining in greater detail one exemplary embodiment of the method for displaying the left side, the right side and the turning pages blocks based on the determined coordinates at each time t of the opened three-dimensional electronic document of FIG. 21.

FIG. 23 is a flowchart outlining in greater detail one exemplary embodiment of the method for determining coordinates of all points of the left side pages block, the right side pages block and the turning pages block at the animation time t of FIG. 21 according to this invention. As shown in FIG. 23, with reference to FIG. 13, operation of the method begins in step S1440, and continues to step S1441, where the coordinates of a second connection point J,H of the turning pages block is determined based on a function of the animation time t, and point J and point C at the beginning of the page turning animation. Since point J,H of the turning pages block moves at a constant speed along the direction of line JC of FIG. 13, the location of point J,H can be determined at animation time t. Operation then continues to step S1442.

In step S1442, the right side pages block EFIH is translated upwards based on the movement of point J,H of the turning pages block and the predetermined dimensions of the right side pages block which remains connected to the turning pages block throughout the animation. Then, in step S1443, the location or coordinates of K is determined based on the coordinates of J,H, the predetermined width of the page line HI, and the angle KJI. Angle KJI is computed as 180*t/T. Next, in step S1444, the angle GCJ is determined as a function of the animation time t, and the initial and final angles of GCJ at the beginning and end of the page turning animation. Operation then continues to step S1445.

In step S1445, point C is determined as a function of the location of J, the thickness of the turning pages block and the angle GCJ. The thickness of the turning pages block is determined based on the number of pages to be turned that is selected by the user. Then, in step S1446, the left side pages block ABCD is translated downwards based on the movement of point C of the turning pages block and the predetermined dimensions of the left side pages block while remaining connected to the turning pages block throughout the animation. Operation then continues to step S1447, where operation of the method returns to step S1450.

In other words, given the location of point J,H, the angle KJI that the turning pages block has rotated, and the slanting angle of CJK, whose deformation is done linearly from the angle of FIG. 13 to the angle of FIG. 17, the locations of points J,K,C,G of the turning pages block are calculated. Since the turning pages block is connected to the left side pages block at point C, we can then calculate the downward translation of the left side pages block ABCD based on the movement of point J,H of the turning pages block and the predetermined dimensions of the left side pages block.

Figure 24:
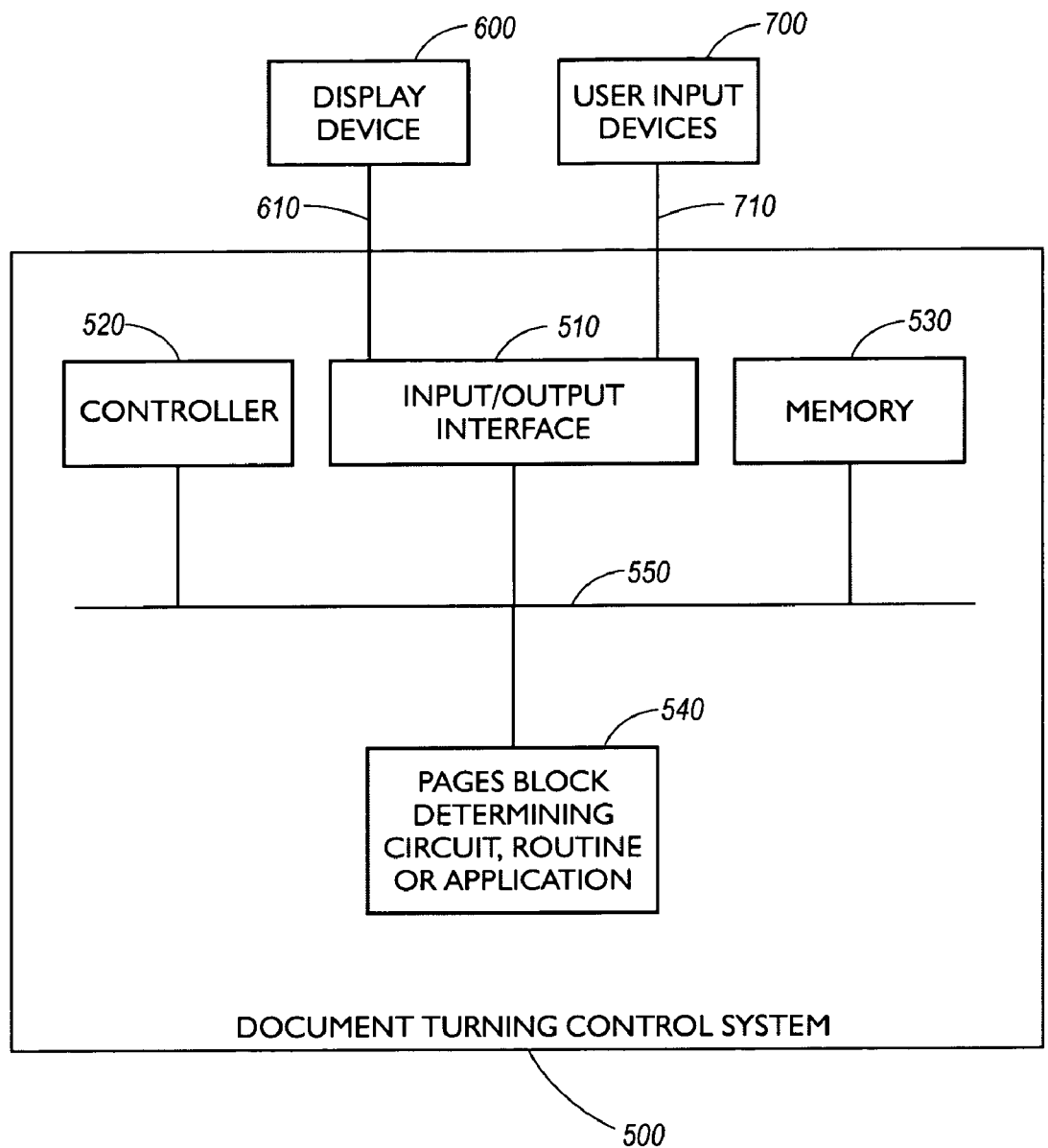
FIG. 24 is a block diagram outlining one exemplary embodiment of a system for turning pages of a three-dimensional electronic document according to this invention.

FIG. 24 is a functional block diagram outlining one exemplary embodiment of a document turning control system 500 according to this invention. As shown in FIG. 24, the document turning control system 500 includes an input/output interface 510, a controller 520, a memory 530, and a pages block determining circuit, routine or application 540, each appropriately interconnected by one or more control and/or data buses 550. The input/output interface 510 is linked to the display device 600 by a link 610, and one or more user input devices 700 by one or more links 710.

Each of the links 550, 610 and 710 can be any known or later-developed connection system or structure usable to connect their respective devices to the document turning control system 500. It should also be understood that links 550, 610 and 710 do not need to be of the same type.

The memory 530 can be implemented using any appropriate combination of alterable, volatile or non-volatile memory or non-alterable, or fixed, memory. The alterable memory, whether volatile or non-volatile, can be implemented by using any one or more of static or dynamic RAM, a floppy disk and disk drive, a writable or rewritable optical disk and disk drive, a hard drive, flash memory or the like. Similarly, the non-alterable or fixed memory can be implemented using any one or more of ROM, PROM, EPROM, EEPROM, and gaps in optical ROM disk, such as a CD ROM or DVD ROM disk and disk drive, or the like.

The input/output interface 510 is connected to the user input devices 700 over a link 710. The user input devices 700 can be one or more of a touch pad, a touch screen, a track ball, a mouse, a keyboard, a stylus or any known or later-developed user input devices 700 for inputting data and/or control signals to the document turning control system 500 for turning pages of the three-dimensional electronic document.

Furthermore, the input/output interface 510 is connected to display device 600 over link 610. In general, the display device 600 can be any device that is capable of displaying a closed virtual document, an opened virtual document and the movement of a left side pages block, a right side pages block and a turning pages block according to the method and the document turning control system 500 of the exemplary embodiments.

The pages block determining circuit, routine or application 540 inputs a user input, and determines the dimensions and coordinates of a closed virtual book or an opened virtual book. Then, the pages block determining circuit, routine or application 540 inputs a user input, and determines the dimensions and point coordinates of the left side pages block, the right side pages block, and the turning page block at animation time t.

The exemplary embodiment of a document turning control system for turning pages of a three-dimensional electronic document according to FIG. 24 operates in the following manner.

In operation, user input is output from the user input device(s) 700 over link 710 to the input/output data interface 510 of the document turning control system 500. The user input includes information regarding the virtual document to be viewed and the number of pages to be turn forwards or backwards. Then, the controller 520 inputs the user input information into the pages block determining circuit, routine or application 540.

The pages block determining circuit, routine or application 540 determines a thickness of the turning pages block based on the selected number of pages and a predetermined thickness of the individual page, and splits the right side pages block into a turning pages block and a new right side pages block under control of the controller 520. Then, the pages block determining circuit, routine or application 540 loads respective low-resolution page textures of faces of the turning block and the new right side page block.

Next, the pages block determining circuit, routine or application 540 determines the point coordinate of all points defining the left side pages block, the right side pages block and the turning pages block at animation time t under control of the controller 520. Then, the pages block determining circuit, routine or application 540 replaces the low-resolution page textures with high-resolution page textures of faces of the new left side pages block and the new right side pages block under control of the controller 520.

During a static state at the beginning and ending of the page turning animation, the pages block determining circuit, routine or application 540 applies high-resolution page textures to the pages blocks to show the visible pages in a higher level of detail. However, during non-static states of the page turning animation, the pages block determining circuit, routine or application 540 applies low-resolution page textures to the pages blocks reduces the time interval for the first animation frame of the virtual book to appear to provide rapid user responsiveness. Since these page textures are stored in the hard drive, these page textures are retrieved from the hard drive under control of controller 520 when necessary. By applying page textures of various resolutions to the top and bottom faces of the page blocks at different stages in the page turning animation, an unlimited number of pages can be contained in the book without encountering scalability problems.

In the exemplary embodiments of the method for turning pages, modeling the two sides of the book as sloping sides allows both sides of the book to be visible to the virtual camera. As a result, how many pages are contained inside the left side pages block and how many pages are contained inside the right side pages block can be easily estimated.

In general, the resolution of a page texture is determined by the I/O performance of the computer and the desired detail of the page to be shown. Also, the texture resolution is determined based on the number of pixels on the computer monitor that are to be used to display the page associated with the texture. For example, if an application window showing an opened book, e.g. as shown in FIG. 11, has a size of 1000×800 pixels, then each of the two top pages is shown within a rectangular area of 500×800 pixels. Most graphics APIs, e.g. OpenGL, require that a texture be represented in a special dimension. As an instance, OpenGL requires that both the width and the height of a texture have a size of power of two. Therefore, to avoid re-sampling when the texture is first applied to the page, it is reasonable to choose a low resolution of 256×512 and a high resolution of 512×1024 for the page textures.

In the exemplary embodiments of the method for turning pages, multi-resolution page textures can also be used to support other features. One exemplary embodiment of other features is the page flipping feature. Similar to the exemplary embodiment of the page turning animation, the page flipping animation may start with the opened virtual book of FIG. 12 and gradually turn a number of pages around the second connection J,H until reaching a certain stage, i.e., FIG. 19. At the beginning of the page flipping animation, low-resolution page textures can be applied to the page blocks to provide rapid user responsiveness. Once the page flipping animation stops, high-resolution page textures can be applied to the page blocks to show the visible pages in a higher level of detail.

The exemplary systems and methods for turning pages of the exemplary three-dimensional virtual books overcome several of the drawbacks described above. For example, as shown in FIG. 17, merging the turning pages block and the left side pages block is accomplished without producing any visual discontinuity because the turning pages block becomes perfectly aligned with the left side pages block. Also, as shown in FIGS. 12 and 17, the top faces of the left side pages block and the right side pages block stay on the static base line before and after the page turning animation, resulting in top pages appearing the same in size under the static state.

While this invention has been described in conjunction with the exemplary embodiments outlined above, it is evidenced that many alternative, modifications and variations will be apparent to those skilled in the art. Accordingly, the exemplary embodiments of the invention, as set forth above, are intended to be illustrative, not limiting. Various changes may be made without departing form the spirit and scope of the invention.

What is claimed is:

1. A method for turning pages of a three-dimensional electronic document having a predetermined length, a predetermined width and a predetermined thickness, comprising:

selecting a number of pages of the three-dimensional document to be turned, each of the pages having a predetermined thickness;

positioning one surface of a first three-dimensional object and one surface of a second three-dimensional object collinear with a static base line before animation of the second three-dimensional object, the first three-dimensional object being connected to the second three-dimensional object at a first connection point that is positioned on the static baseline before animation;

animating, relative to predetermined coordinates of the static base line, movement of the first three-dimensional object, the second three-dimensional object connected to the first three-dimensional object at the first connection point, and a third three-dimensional object connected to the second three-dimensional object at a second connection point, the second connection point being positioned below the static baseline before animation such that during the animation the first connection point moves away from the static baseline in the direction of the second connection point and the second connection point moves toward the static baseline;

positioning the one surface of the first three-dimensional object, the third three-dimensional object, the first connection point and the second connection point below the static base line during animation of the second three-dimensional object;

maintaining a first connection at the first connection point and a second connection at the second connection point while animating the movement of the first three-dimensional object, the second three-dimensional object, the third three-dimensional object, the first connection point, and the second connection point; and positioning another surface of the second three-dimensional object and one surface of the third three-dimensional object collinear with the static base line, and positioning the second connection point on the static baseline, after animation of the second three-dimensional object.

2. The method of claim 1, wherein animating the movement of the first three-dimensional object, the second three-dimensional object, and the third three-dimensional object comprises:

splitting an initial three-dimensional object into the second three-dimensional object and the third three-dimensional object;

setting a starting animation time to be a current clock time, and setting an animation time;

determining coordinates of points of the first three-dimensional object, the second three-dimensional object and the third three-dimensional object at the animation time; and displaying the first three-dimensional object, the second three-dimensional object and the third three-dimensional object.

3. The method of claim 2, wherein animating the movement of the first three-dimensional object, the second three-dimensional object, and the third three-dimensional object further comprises loading low-resolution page textures corresponding to a top face and a bottom face of the second three-dimensional object, and a top face of the third three-dimensional object.

4. The method of claim 3, wherein animating the movement of the first three-dimensional object, the second three-dimensional object, and the third three-dimensional object further comprises replacing the low-resolution page textures with high-resolution page textures.

5. The method of claim 2, wherein animating the movement of the first three-dimensional object, the second three-dimensional object, and the third three-dimensional object further comprises merging the first three-dimensional object and the second three-dimensional object to form a new first three-dimensional object.

6. The method of claim 2, wherein splitting the initial three-dimensional object into the second three-dimensional object and the third three-dimensional object comprises:
- determining a thickness of the second three-dimensional object based on the selected number of pages and the predetermined thickness of the pages;
- determining a thickness of the third three-dimensional object based on the difference between a predetermined thickness of the initial three-dimensional object and the determined thickness of the second three-dimensional object; and
- determining initial coordinates of points of the first three-dimensional object, the second three-dimensional object, and the third three-dimensional object based on the respective thickness, the predetermined length and the predetermined width, and relative to the predetermined coordinates of the static base line.

7. The method of claim 2, wherein determining the coordinates of the points of the first three-dimensional object, the second three-dimensional object, and the third three-dimensional object at the animation time comprises:
- determining the coordinates of the second connection point of the second three-dimensional object based on a function of the animation time, and the first connection point and the second connection point at a beginning of a page turning animation;
- translating the third three-dimensional object based on a movement of the second connection point; translating the first three-dimensional object based on a movement of the first connection point; and
- translating, rotating, and deforming the second three-dimensional object based on a function of a movement of the second connection point and the animation time.

8. The method of claim 2, wherein setting the animation time comprises setting the animation time to be the current clock time minus the starting animation time.

9. The method of claim 2, wherein displaying the first three-dimensional object, the second three-dimensional object and the third three-dimensional object includes displaying each of the first three-dimensional object, the second three-dimensional object and the third three-dimensional object having six faces.

10. The method of claim 9, wherein displaying the first three-dimensional object, the second three-dimensional object and the third three-dimensional object includes displaying at least one face of at least one of the first three-dimensional object, the second three-dimensional object and the third three-dimensional object as a flat surface.

11. The method of claim 9, wherein displaying the first three-dimensional object, the second three-dimensional object and the third three-dimensional object includes displaying at least one face of at least one of the first three-dimensional object, the second three-dimensional object and the third three-dimensional object as a parallelogram.

12. The method of claim 9, wherein displaying the first three-dimensional object includes displaying at least one face of the first three-dimensional object as a curved surface.

13. The method of claim 9, wherein displaying the second three-dimensional object includes displaying at least one face of the second three-dimensional object as a curved surface.

14. The method of claim 9, wherein displaying the third three-dimensional object includes displaying at least one face of the third three-dimensional object as a curved surface.

15. The method of claim 1, wherein at least one of the first three-dimensional object and the third three-dimensional object is not displayed.

16. The method of claim 1, further comprising applying multiple resolution page textures to the first three-dimensional object, the second three-dimensional object and the third three-dimensional object.

17. The method of claim 16, wherein applying multiple resolution page textures comprises applying, in a non-static state, low-resolution page textures to a top face of the first three-dimensional object, a bottom and a top face of the second three-dimensional object, and a top face of the third three-dimensional object.

18. The method of claim 17, wherein applying multiple resolution page textures further comprises replacing, in a static state, some of the low-resolution page textures with corresponding high-resolution page textures.

19. A method for turning pages of a three-dimensional electronic document having a predetermined length, a predetermined width and a predetermined thickness, comprising:
- providing said three-dimensional electronic document having first and second three-dimensional objects, each three-dimensional object having first and second surfaces wherein the first surfaces of both the first and second three-dimensional objects are collinear with a predetermined static base line and the first three-dimensional object is connected to the second three-dimensional object at a first connection point positioned on the static baseline;
- selecting a number of pages to be turned from the second three-dimensional object wherein the second three-dimensional object is divided into first and second portions such that the first portion represents pages to be turned and the first portion contains first and second surfaces wherein the first surface of the first portion is the first surface of the second three-dimensional object, and the second portion contains first and second surfaces wherein the first and second portions are connected at least at a second connection point below the static base line;
- animating movement of the first three-dimensional object and the first and second portions of the second three-dimensional object such that:
  - the first connection point moves downward from the static baseline and the second connection point moves upward towards the static baseline until it reaches the position where the first connection point was located in the providing step;
  - the first surface of the first three-dimensional object moves downward from the static baseline;
  - the first surface of the first portion moves to becomes collinear with the first surface of the first three-dimensional object and the second surface of the first portion becomes collinear with the static base line; and
  - the first surface of the second portion moves upward towards the static baseline to become collinear with the static baseline; and
- merging the first portion into the first three-dimensional object to create a new first three-dimensional object and the second portion becomes a new second three-dimensional object.

20. The method of claim 19, wherein animating the movement of the first three-dimensional object and the first and second portions of the second three-dimensional object comprises:
- setting a starting animation time to be a current clock time, and setting an animation time;

determining coordinates of points of the first three-dimensional object, and the first and second portions of the second three-dimensional object at the animation time; and displaying the first three-dimensional object and the first and second portions of the second three-dimensional object.

21. The method of claim 20, wherein displaying the first three-dimensional object and the first and second portions of the second three-dimensional object includes displaying at least one face of at least one of the first three-dimensional object and the first and second portions of the second three-dimensional object as a flat surface.

22. The method of claim 20, wherein displaying the first portion of the second three-dimensional object includes displaying at least one face of the first portion of the second three-dimensional object as a curved surface.

23. The method of claim 19, further comprising applying multiple resolution page textures to the first three-dimensional object and the first and second portions of the second three-dimensional object.

24. The method of claim 19, wherein animating the movement of the first three-dimensional object and the first and second portions of the second three-dimensional object further comprises loading page textures corresponding to a top face and a bottom face of the first portion of the second three-dimensional object, and a top face of the second portion of the second three-dimensional object.

* * * * *